United States Patent
Kokubu et al.

[11] Patent Number: 5,838,254
[45] Date of Patent: Nov. 17, 1998

[54] TRANSMISSION-RECEPTION TIME CORRECTION SYSTEM

[75] Inventors: Sadao Kokubu; Hisashi Aoki; Takashi Mizuno; Shinichi Koga, all of Aichi, Japan

[73] Assignee: Kabushiki Kaisha Tokai-Rika-Denki-Seisakusho, Japan

[21] Appl. No.: 754,799

[22] Filed: Nov. 21, 1996

[30] Foreign Application Priority Data

Nov. 22, 1995 [JP] Japan ................................. 7-304133

[51] Int. Cl.⁶ .................................................... H04Q 1/00
[52] U.S. Cl. .................................. 340/825.54; 340/825.2
[58] Field of Search ........................... 340/825.54, 825.2, 340/572, 573; 375/111

[56] References Cited

U.S. PATENT DOCUMENTS

| | | |
|---|---|---|
| 4,803,703 | 2/1989 | DeLuca ..................................... 375/11 |
| 4,852,090 | 7/1989 | Borth ....................................... 375/111 |
| 5,276,706 | 1/1994 | Critchlow ................................ 375/111 |
| 5,376,932 | 12/1994 | Samokin ............................. 340/825.54 |

*Primary Examiner*—Brian Zimmerman
*Attorney, Agent, or Firm*—Oliff & Berridge, PLC

[57] ABSTRACT

The invention relates to a transmission-reception system. A transponder receiver unit contained in the key bow of an ignition key has a power circuit that receivers, rectifies and smoothes the carrier wave signal transmitted together with a time reference signal and an enquiry signal from the transmission-reception ECU of a motor vehicle. A microcomputer in the transponder becomes active when the output voltage of the power circuit reaches a predetermined level or higher. When activated, the microcomputer measures the time length of the received reference time signal using the clock signal generated by an oscillation circuit, and calculates a ratio, as a correction coefficient, between the measured time length and a stored reference time value. The microcomputer decodes the enquiry signal while correcting the time information included in the time series pulse signal forming the enquiry signal, using the correction coefficient.

9 Claims, 4 Drawing Sheets

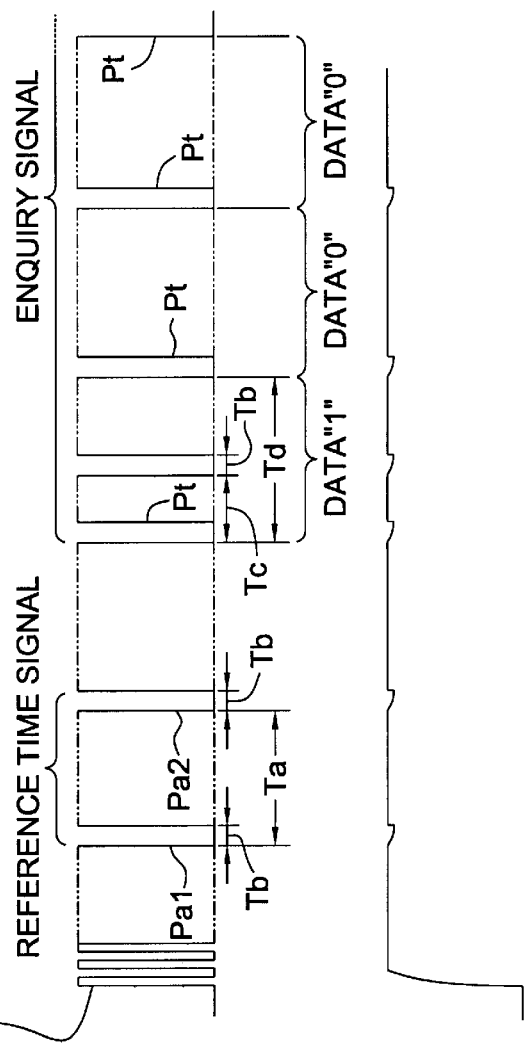
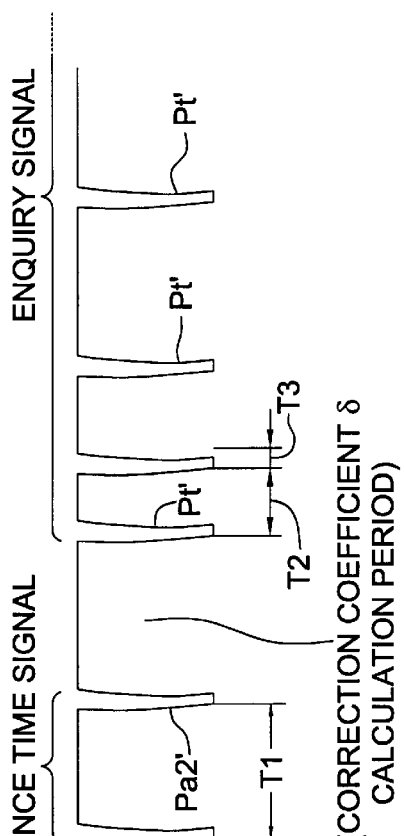
Fig. 3(a) WAVEFORM OF SIGNAL FROM TRANSMITTER-RECEIVER ECU 10
Fig. 3(b) WAVEFORM OF VOLTAGE OUTPUTTED FROM POWER CIRCUIT 12
Fig. 3(c) WAVEFORM OF SIGNAL RECEIVED BY DETECTOR CIRCUIT 13

COMBINED IMPEDANCE OF
RESONANCE CIRCUIT PORTION 7
AND MODULATING CIRCUIT 6

VOLTAGE WAVEFORM
OF ANTENNA COIL 16

TRANSMISSION-RECEPTION TIME CORRECTION SYSTEM

BACKGROUND OF THE INVENTION

1. Field of the Invention

The present invention relates to a transmission-reception system including a transmitter-receiver device for transmitting a power signal and an enquiry signal, and a transponder that, upon receiving the enquiry signal and the power signal, sends back an answer signal using the power signal as a power source.

2. Description of the Related Art

To enhance security performance of motor vehicles against theft, it has been known in the art to equip a motor-vehicle ignition key with an electronic key function using an electric identification code. The motor vehicle is correspondingly equipped with a transmission-reception ECU, and when an ignition key as described above is inserted in the ignition keyway and turned to the ON position (or the ACC position), the ECU reads the identification code of the key, and permits the start of the engine by the ignition key only when the read identification code agrees with a predetermined identification code.

To construct such a transmission-reception system, the transmission-reception ECU is provided with an antenna coil disposed around the keyway, so as to perform an. interrogator function of transmitting a carrier wave signal and an enquiry signal convoluted with the carrier wave signal from the antenna coil.

In addition, the bow of the ignition key contains EL transponder provided with a transponder coil that, when the ignition key is inserted in the keyway, is electromagnetically coupled with the antenna coil. The transponder uses as a power source an output provided by rectifying the carrier wave signal received through the transponder coil. When the power rises, the transponder responds to the received enquiry signal by sending back an answer signal including a pre-stored identification code.

The above-described transmission-reception system uses serial communication. That is, the transmission-reception ECU transmits an enquiry signal formed of a time series pulse signal including time information (for example, a combination of a timing signal train of a fixed cycle and a binary signal train combined with the individual timing signals), which signal is convoluted with a carrier wave signal. In addition, the transponder decodes the content of the enquiry signal received on the basis of the time information contained therein, and then sends back an answer signal corresponding to the decoding result, in the form of a time series pulse signal.

Conventional transponders for the aforementioned applications are normally constructed by hard logic, resulting in fixed identification codes. Since fixed identification codes are relatively easy to copy or intercept, the conventional art is unable to sufficiently safeguard privacy or security performance against theft.

One conceivable measure for this problem is that a microcomputer is provided in a transponder so that the identification code is enciphered or encoded in various manners using microcomputer control, thus enhancing security. Since size reduction of the transponder becomes important for this measure and costs should usually be curbed, it is conceivable that a CR oscillator, which can easily be miniaturized and is inexpensive, should normally be used as an oscillating circuit that determines the clock frequency of the microcomputer.

However, CR oscillating circuits have voltage dependency in that the oscillating frequency decreases as the power voltage decreases, so that the employment of a CR oscillating circuit is likely to cause the following problems.

Since the transponder is supplied with power in a non-contact manner through the transponder coil electromagnetically coupled with the antenna coil of a transmitter-receiver device, the power inevitably varies depending on factors including variations in the distance between the transponder coil and the antenna coil, the ambient temperature, and the circuit constants of the electronic components constituting the transponder and the transmission-reception ECU. Variation in the power changes the oscillating frequency of the CR oscillating circuit and, therefore, changes the clock frequency of the microcomputer.

Thus the transponder suffers inaccurate time management by the microcomputer of the transponder, deteriorating communication performance. For example, errors become likely to occur in the aforementioned decoding of the content of an enquiry signal based on time information.

SUMMARY OF THE INVENTION

It is accordingly an object of the present invention to provide a transmission-reception system that enhances security without degrading communication performance, and that prevents cost and size increases in the transponder.

According to the present invention, there is provided a transmission-reception system comprising: a transmitter-receiver device transmitting an enquiry signal formed of a time series pulse signal including time information, together with a power signal, the transmitter-receiver device being constructed to transmit a reference time signal of a fixed time length together with the power signal before transmitting the enquiry signal; and a transponder that is switchable to an active state by the power signal from the transmitter-receiver device, to decode the content of the received enquiry signal on the basis of the time information, and that sends back to the transmitter-receiver device an answer signal in accordance with the result of decoding. The transponder comprises a microcomputer for decoding the content of the enquire signal and controlling the transmission of the answer signal, and a storage portion that stores a value of the reference time. Upon receiving the reference time signal from the transmitter-receiver device, the transponder measures the time length of the reference time signal using a clock signal of the microcomputer, and calculates as a correction coefficient a ratio between the measured time length and the reference time value stored in the storage portion, and, while the microcomputer is decoding the enquiry signal, corrects the time information included in the time series pulse signal forming the received enquiry signal using the correction coefficient.

With this construction, since control of the transponder is performed by the microcomputer, it becomes possible to encipher or encode the answer signal for an enquiry signal as desired without complicating hardware construction. The invention thus enhances privacy and security.

Furthermore, the transmitter-receiver device transmits the reference time signal of a fixed time length together with the power signal before transmitting the enquiry signal formed of a time series pulse signal including time information, together with the power signal. Upon receiving the reference time signal, the transponder measures the time length of the reference time signal using the clock signal of the microcomputer, and calculates, as a correction coefficient, a ratio between the measured time length and the reference time value stored in the storage portion. While decoding the enquiry signal, the microcomputer corrects the time information included in the time series pulse signal forming the enquiry signal, using the correction coefficient.

Therefore, even if fluctuation of the power voltage of the transponder changes the clock frequency of the microcomputer from the initial setting so that the time management by the microcomputer becomes less accurate, the microcomputer decodes the content of the enquiry signal while correcting the time information included in the time series pulse signal forming the enquiry signal. This construction thus eliminates the danger of causing errors in the decoding operation as suffered by the conventional art, preventing a deterioration in communication performance.

Preferably, the transponder is constructed to send back an answer signal formed of a time series pulse signal including time information, and so as to transmit an answer reference time signal of a fixed time length using the clock signal of the microcomputer, prior to an operation of transmitting the answer signal. Upon receiving the answer reference time signal from the transponder, the transmitter-receiver device measures the time length of the answer reference time signal, and calculates as a second correction coefficient a ratio between the measured time length and the time length of the reference time signal, and performs an operation of decoding content of the received answer signal while correcting the time information included in the time series pulse signal forming the answer signal, using the second correction coefficient.

With this preferred construction, even if fluctuation of the power voltage of the transponder causes a situation where the time management by the microcomputer of the transponder becomes less accurate, the transmitter-receiver device is able to precisely perform the operation of decoding the answer signal from the transponder, thus improving communication performance.

In addition, the transmission-reception system in another preferred construction is constructed to send back an answer signal formed of a time series pulse signal including time information, and to send back the aforementioned correction coefficient prior to an operation of transmitting the answer signal, in which the transmitter-receiver device is constructed to perform an operation of decoding content of the answer signal from the transponder while correcting the time information included in the time series pulse signal forming the answer signal using the correction coefficient. This preferred construction also enables the transmitter-receiver device to precisely perform the operation of decoding the answer signal,thus improving communication performance.

The transmission-reception system in still another preferred construction is constructed to send back an answer signal formed of a time series pulse signal including time information that has been corrected by the aforementioned correction coefficient, in which the transmitter-receiver device is constructed to decode the content of the answer signal from the transponder on the basis of the time information included in the time series pulse signal forming the answer signal. This preferred construction also enables the transmitter-receiver device to precisely perform the operation of decoding the answer signal, thus improving communication performance.

BRIEF DESCRIPTION OF THE DRAWINGS

The foregoing and further objects, features and advantages of the present invention will become apparent from the following description of a preferred embodiment with reference to the accompanying drawings, wherein:

FIGS. 3A to 3C show waveforms of outputs from different components, for illustration of the operation of the embodiment.

DETAILED DESCRIPTION OF PREFERRED EMBODIMENT

A preferred embodiment in which the present invention is applied to an automotive immobilizer function will be described with reference to the drawings.

Figure 1:
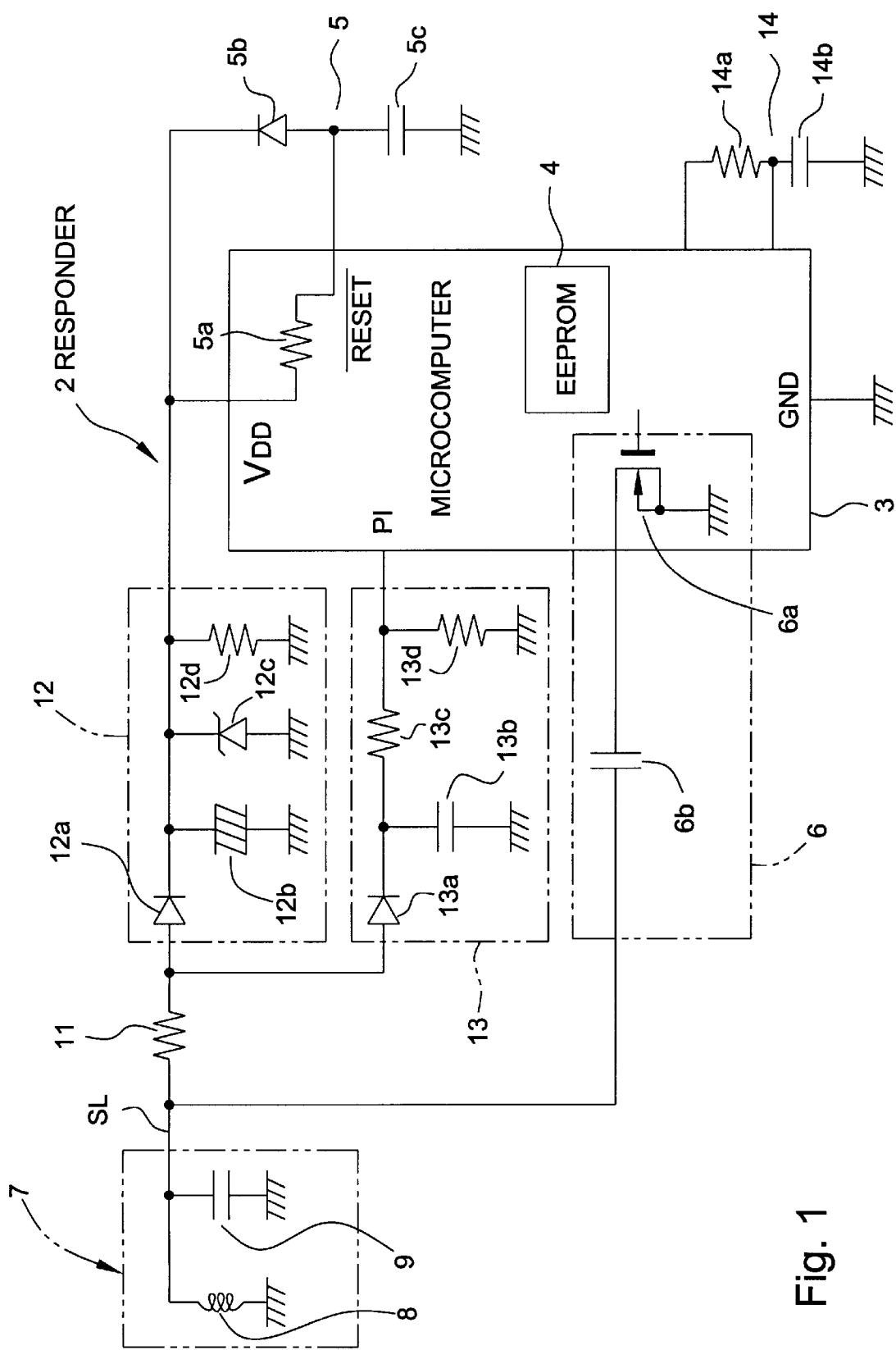
FIG. 1 illustrates an electrical construction of an embodiment of the transmitter-receiver unit of the invention.
Figure 2:
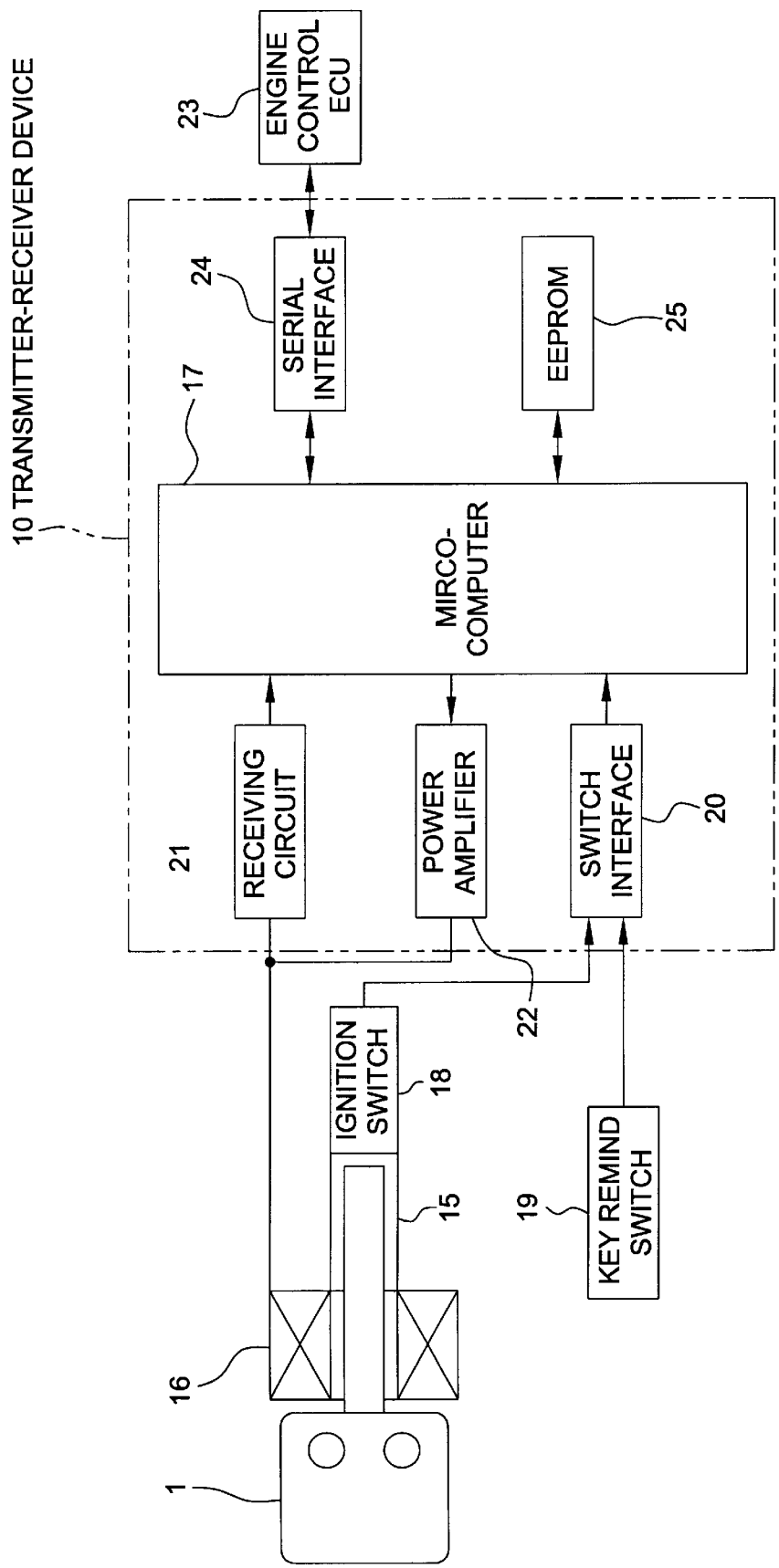
FIG. 2 is a functional block diagram of the overall system construction of the invention.

FIG. 1 illustrates an electrical construction of a transmitter-receiver unit 2 (corresponding to a transponder according to the invention), contained in the bow of an ignition key 1 shown in FIG. 2. Referring to FIG. 1, the transmitter-receiver unit 2 has a microcomputer 3 as a significant component. Upon receiving a power signal and an enquiry signal from outside, the transmitter-receiver unit 2 responds to the enquiry signal by sending back an answer signal described below.

The microcomputer 3 contains an EEPROM 4, a resistor 5a of a power-on reset circuit 5, and an n-channel FET 6a of a modulating circuit 6. The EEPROM 4 stores an identification code specific to the corresponding ignition key 1, and also stores a function expression for enciphering the identification code, and predetermined reference time values $\Delta Ta$, $\Delta Tb$, $\Delta Tc$, $\Delta Td$.

The reference time values $\Delta Ta$, $\Delta Tb$, $\Delta Tc$, $\Delta Td$ are expressed as, for example, value data based on the rated clock frequency of the microcomputer 3, that is, value data indicating the clock signal number in the rated frequency. The reference time values $\Delta Ta$, $\Delta Tb$, $\Delta Tc$, $\Delta Td$ are not necessarily stored in the EEPROM 4, but may be pre-stored in a ROM (not shown) provided in the microcomputer 3.

A resonance circuit portion 7 comprises a transponder coil 8 and a resonance capacitor 9 that are connected in parallel between a signal line SL and a ground terminal. The resonance frequency is preset to equal the frequency band of the carrier wave signal (corresponding to the power signal) transmitted from a transmission-reception ECU 10 (shown in FIG. 2) installed as a transmitter-receiver device in the motor vehicle.

A power circuit 12, connected to the signal line SL by a resistor 11, rectifies and smoothes the carrier wave signal received by the resonance circuit portion 7 and sends the thus-obtained output to a power terminal VDD of the microcomputer 3. The power circuit 12 comprises a rectifying diode 12a, a smoothing capacitor 12b, a constant-voltage diode 12c and a resistor 12d that are connected as shown in FIG. 1.

A detector circuit 13, connected to the signal line SL by the resistor 11, discriminates the reference time signal and enquiry signal supplied together with the carrier wave signal through the resonance circuit portion 7, and sends the discriminated signals to an input port PI of the microcomputer 3. The detector circuit 13 comprises a detector diode 13a, a capacitor 13b, and resistors 13c, 13d that are connected as shown in FIG. 1.

The time constant of the detector circuit 13 is preset to a value less than the charging time constant of the smoothing function portion of the power circuit 12, thus enabling discrimination of the reference time and enquiry signals.

The modulating circuit 6, comprising the FET 6a, is connected in parallel to the resonance capacitor 9 of the resonance circuit portion 7. In the modulating circuit 6, a modulating capacitor 6b and the source and drain of the FET 6a are connected in series. In accordance with the turning on and off of the FET 6a, the impedance of the resonance circuit portion 7 can be changed.

The reset circuit 5 performs the power-on reset function of holding the microcomputer 3 in a reset state until the level of power supplied to the power terminal VDD of the microcomputer 3 (the output voltage level of the power circuit 12) reaches a predetermined level or higher. The reset circuit 5 comprises a diode 5b, a capacitor 5c and the resistor 5a, which are connected as shown in FIG. 1. A CR oscillating circuit 14 comprises a resistor 14a and a capacitor 14b, and determines the clock frequency of the microcomputer 3.

FIG. 2 schematically illustrates the overall, construction of the system of the invention by a combination of the functional blocks. Referring to FIG. 2, an antenna coil 16 is provided around an ignition cylinder 15 of the motor vehicle. When the ignition key 1 is inserted in the cylinder 15, the antenna coil 16 is electromagnetically coupled with the transponder coil 8 (see FIG. 1) contained in the ignition key 1.

The transmission-reception ECU 10, provided in this motor vehicle, comprises a microcomputer 17 as a significant component. The microcomputer 17 receives on-signals from a key remind switch 19 and an ignition switch 18 provided for the cylinder 15 as is well known in the art, via a switch interface 20. The signal received by the antenna coil 16 is inputted to the microcomputer 17 through a receiving circuit 21 that has an amplifying function.

The microcomputer 17 controls the transmission through the antenna coil 16 by the output from a power amplifier 22. The microcomputer 17 sends signals to and receives signals from an engine control ECU 23 through a serial interface 24. The microcomputer 17 selectively inhibits the engine control ECU 23 from performing the engine starting operation.

In addition, the microcomputer 17 outputs data to and reads data from an EEPROM 25. Pre-stored in the EEPROM 25 are the same identification code and function expression for enciphering the identification code as the identification code and function expression for the encipherment stored in the EEPROM 4 of the ignition key 1 provided corresponding to the motor vehicle.

The controls by the microcomputer 3 of the transmitter-receiver unit 2 and the microcomputer 17 of the transmission-reception ECU 10 will be described in conjunction with the functions of related components.

When the microcomputer 17 of the transmission-reception ECU 10 receives on-signals from the key remind switch 19 and the ignition switch 18, that is, when the ignition key 1 is inserted into the cylinder 15 and turned to the on-position (in this state, the antenna coil 16 and the transponder coil 8 of the ignition key 1 are electromagnetically coupled), the microcomputer 17 generates new random number data by a predetermined function calculation, and stores the random number data into an internal memory (not shown) such as a RAM. The microcomputer 17 also generates a reference time signal and a pulse-train enquiry signal that includes the random number data, and operates the power amplifier 22 to transmit from the antenna coil 16 a predetermined-frequency carrier wave signal and the reference time signal and enquiry signal, convoluted therewith.

The reference time signal and the enquiry signal have a form as indicated in FIG. 3A. The reference time signal is formed of a combination of a pair of falling pulses Pa1, Pa2 (having a fixed pulse length of Tb) that are outputted at a fixed interval Ta starting at a time point when a predetermined length of time elapses after the start of transmission of a carrier wave signal (actually, a sine wave signal). The time interval Ta is used as a time reference by the transmitter-receiver unit 2.

The enquiry signal has a format including time information provided by a combinations of a train of fixed-interval falling timing pulses Pt and a train of data (in FIG. 3A, the high voltage status expresses data "0", and the low voltage status expresses data "1") formed of binary signals expressed by the carrier wave signal voltage levels occurring during a predetermined time length Tb, after the timing at which a predetermined waiting time Tc has elapsed following the fall of each timing pulse Pt. The data train expresses start bit data indicating that the signal is an enquiry signal, and the aforementioned random number data, stop bit data, and the like.

The timing pulses Pt and the falling pulses in the data train have a fixed pulse length Tb. The output interval of the timing pulses Pt is fixed to Td. The time interval Ta, the pulse length Tb, the waiting time Tc and the output interval Td of the timing pulses Pt are adjusted to equal the reference time values DTa, DTb, DTc, DTd, respectively, stored in the EEPROM 4 of the transmitter-receiver unit 2.

When the transmission-reception ECU 10 transmits the carrier wave signal, the reference time signal and the enquiry signal to the transmitter-receiver unit 2 as described above, the power circuit 12 of the transmitter-receiver unit 2 rectifies and smoothes the carrier wave and sends the thus-obtained output (the voltage waveform indicated in FIG. 3B) to the power terminal VDD of the microcomputer 3. When the output voltage reaches the predetermined level or higher, the reset maintenance by the reset circuit 5 is canceled so that the microcomputer 3 switches to the active state. In addition, the detector circuit 13 discriminates the reference time signal and the enquiry signal, and supplies them to the input port PI of the microcomputer 3.

The thus-activated microcomputer 3 sequentially performs the control steps or actions (1)–(5) discussed below.

(1) The microcomputer 3 measures the time interval Ta indicated by the reference time signal received through the detector circuit 13, using the clock signal number provided by the CR oscillating circuit 14, and temporarily stores the measurement result. More specifically, as indicated in FIG. 3C, the microcomputer 3 calculates a measured time value T1 corresponding to the time interval Ta, by counting the number of clock signals occurring during a period from the timing at which the pulse Pa1' constituting the received reference time signal falls to the timing at which the next pulse Pa2' falls.

(2) During a subsequent period until the enquiry signal is received, the microcomputer 3 calculates a ratio between the measured time value T1 and the reference time value $\Delta$Ta read from the EEPROM 4, as a correction coefficient $\delta$ (=$\Delta$Ta/T1). Since the measured time value T1 decreases as the clock signal frequency decreases, the correction coefficient $\delta$ increases as the clock frequency by the CR oscillating circuit 14 decreases.

(3) Upon starting to receive the enquiry signal, the microcomputer 3 measures a time T2 starting at the fall timing of each timing pulse Pt' included in the enquiry signal and ending when the reference time value $\Delta$Tc stored in the EEPROM 4 elapses, and then measures a time T3 starting at the timing at which the measurement of the time T2 is completed, and ending at the timing at which the reference time value ΔTb in the EEPROM 4 elapses, and determines whether the voltage level of the enquiry signal has risen during the measurement of the time T3. By repeating this procedure, the microcomputer 3 decodes the pulse-like data train included in the enquiry signal.

Since the measured time values T2, T3 decrease as the clock signal frequency decreases, errors will occur between these values and the actual reference time values ΔTb, ΔTc if the clock signal frequency fluctuates. Therefore, the microcomputer 3 corrects the measured time values T2, T3 by the correction coefficient δ (=ΔTa/T1) for the decoding of the enquiry signal. That is, the enquiry signal is decoded by using corrected measured time values T2', T3' determined by the following equations:

$$T2'=\delta \cdot T2=T2 \cdot \Delta Ta/T1$$

$$T3'=\delta \cdot T3=T3 \cdot \Delta Ta/T1$$

Since the correction coefficient δ increases as the clock frequency by the CR oscillating circuit 14 decreases, the corrected measured time values T2', T3' determined by the correction control will become closer to the actual reference time values ΔTb, ΔTc, under conditions where the measured time values T2, T3 decrease as the clock frequency decreases.

If a K % tolerance is to be allowed for the reference time values ΔTb, ΔTc, the corrected measured times T2', T3' may be provided with error allowances within the following ranges:

$$\Delta Tb \times (1-K/100) \leq T2' \leq \Delta Tb \times (1+K/100)$$

$$\Delta Tc \times (1-K/100) \leq T3' \leq \Delta Tc \times (1+K/100)$$

If there is a need to verify whether the timing pulses Pt' are inputted at the correct timing, the reference time value ΔTd is used for that purpose. If a time until the reference time value ΔTd elapses is measured, correction similar to that described above may be performed.

(4) When the decoding of the enquiry signal ends, that is, when the random data has been extracted from the enquiry signal, the microcomputer 3 produces a cipher code for an answer signal using the random data and the identification code and the enciphering function expression stored in the EEPROM 4. More specifically, the function expression is an arithmetic expression using the random data and the identification code as variables. The result of the function calculation is used as the cipher code.

(5) Then, the microcomputer 3 transmits to the transmission-reception ECU 10 the answer reference time signal indicating the measured time value T1 calculated in the control (1) and the answer signal including the thus-obtained cipher code, in that order. (The answer reference time signal has substantially the same form as the reference time signal transmitted from the transmission-reception ECU 10 as indicated in FIG. 3A, that is, it is formed of a combination of a pair of falling pulses outputted at a time interval indicating the measured time value T1).

Figures 4A, 4B:
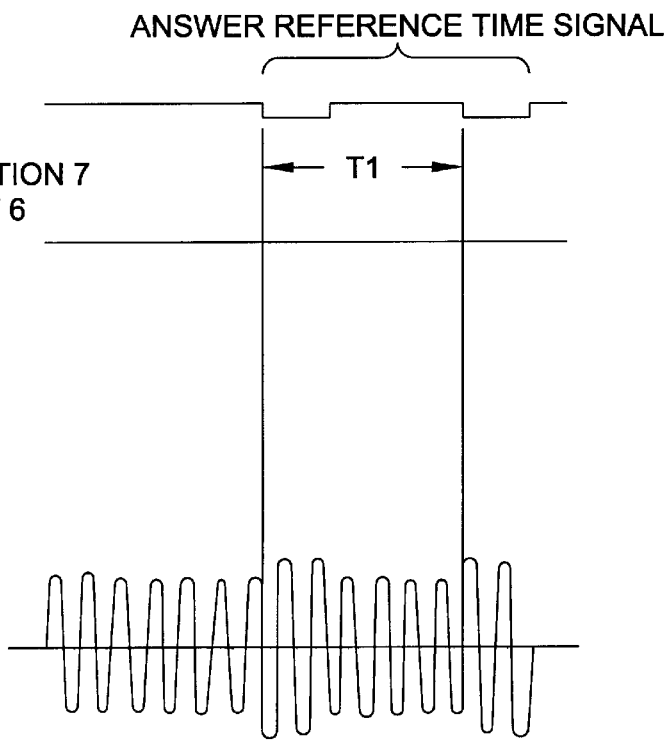
FIGS. 4A, 4B also show waveforms of outputs from different components, for illustration of the operation of the embodiment.

For this transmission, the microcomputer 3 performs on-off control of the FET 6a of the modulating circuit 6 in a mode corresponding to the answer reference time signal and the cipher code, so as to change the combined impedance of the resonance circuit portion 7 and the modulating circuit 6 as indicated in FIG. 4A. The received carrier wave signal is thus modulated in amplitude in a mode corresponding to the answer reference time signal and the cipher code. At the end of the transmission-reception ECU 10, the voltage of the antenna coil 16 changes as indicated in FIG. 4B in a mode corresponding to the amplitude modulating signal from the modulating circuit 6 of the transmitter-receiver unit 2. By detecting such voltage changes, the transmission-reception ECU 10 receives the answer reference time signal and the answer signal, which comprises a time series pulse signal including time information and which has been enciphered (FIG. 4B indicates only the answer reference time signal).

The time interval T1 of the answer reference time signal is determined using the clock signal of the microcomputer.

When the transmission-reception ECU 10 receives the answer reference time signal and the answer signal transmitted as described above, the microcomputer 17 performs the following control steps or actions, (6)–(10).

(6) The microcomputer 17 measures the time interval T1 indicated by the received answer reference time signal, and temporarily stores the measurement result ΔT1. This measurement is carried out using the time reference used to determine the time interval Ta (see FIG. 3A) of the reference time signal transmitted to the transmitter-receiver unit 2.

(7) During a subsequent period until the answer signal is received, the microcomputer 17 calculates a ratio between the measured time value ΔT1 and the time interval Ta of the reference time signal, as a second correction coefficient δ2 (=Ta/ΔT1). Since the measured time value ΔT1 increases as the clock signal frequency of the transmitter-receiver unit 2 decreases, the second correction coefficient δ2 decreases as the clock frequency by the CR oscillating circuit 14 of the transmitter-receiver unit 2 decreases.

(8) Upon starting to receive the answer signal, the microcomputer 17 decodes the content of the answer signal while correcting the time information included in the time series pulse signal forming the answer signal on the basis of the second correction coefficient δ2.

(9) When the decoding of the answer signal ends, the microcomputer 17 determines a cipher code by substantially the same function calculation as in the microcomputer 3 of the transmitter-receiver unit 2, based on the random number data read from the internal memory (not shown) and the identification code and the enciphering function expression read from the EEPROM 25. The microcomputer 17 then performs the decoding operation by comparing the thus-determined cipher code with the cipher code included in the answer signal transmitted from the transmitter-receiver unit 2. If they do not agree, that is, if the received answer signal is incorrect, the microcomputer 17 causes the engine control ECU 23 to inhibit starting the motor vehicle engine.

Since the starting of the motor vehicle engine is inhibited if the ignition switch 18 is turned on by an incorrect ignition key 1 having a disagreeing identification code, security against theft is enhanced.

(10) If the decoding operation finds that the cipher code determined by calculation agrees with the cipher code included in the answer signal transmitted from the transmitter-receiver unit 2, that is, if the received answer signal is correct, the microcomputer 17 allows the engine control ECU 23 to start the motor vehicle engine.

In short, the starting of the motor vehicle engine by the engine control ECU 23 is allowed if the ignition cylinder 15 receives the correct ignition key 1, so that their identification codes agree with each other. The embodiment thus performs a security immobilizer function.

As understood from the above description, the advantages of this embodiment include the following.

Since the transmitter-receiver unit 2 is constructed so as to send back an enciphered answer signal in response to an enquiry signal from the transmission-reception ECU 10, the embodiment improves security and, therefore, enhances protection against theft of the motor vehicle. Since the encipherment of the answer signal is based on the program of the microcomputer 3, the embodiment enables various encipherment or coding as desired for improvement in security, without complicating hardware construction.

Since the transmitter-receiver unit 2 is constructed to employ the CR oscillating circuit 15, which can be easily miniaturized and is inexpensive, as an oscillating circuit for determining the clock frequency of the microcomputer 3, the embodiment prevents size and cost increases.

In the construction employing the CR oscillating circuit 14, cases are expected where fluctuation of the power voltage (output voltage of the power circuit 12) of the transmitter-receiver unit 2 changes the clock frequency of the microcomputer 3 from the initial setting so that the time management by the microcomputer 3 may become less accurate. However, according to this embodiment, if the clock frequency changes, that is, if the output voltage of the power circuit 12 fluctuates, the time reference of the microcomputer 3 is automatically corrected by the correction coefficient $\delta$. That is, the microcomputer 3 performs the decoding of the content of the enquiry signal while correcting the time information included in the time series pulse signal forming the enquiry signal. The embodiment thus eliminates the danger of causing errors in the decoding as suffered by the conventional art, and thereby prevents a degradation of communication performance.

Furthermore, in a situation where the time management of the microcomputer 3 may become less accurate, the transmission-reception ECU 10 decodes the answer signal from the transmitter-receiver unit 2 while the time reference of the microcomputer 17 is automatically corrected on the basis of the second correction coefficient $\delta 2$. The embodiment thus enables the microcomputer 17 to perform precise decoding in such a situation, improving communication performance.

Although according to the embodiment, the transmitter-receiver unit 2 sends back to the transmission-reception ECU 10 the answer reference time signal generated by using the clock signal of the microcomputer 3, and the enciphered answer signal, in that order, it is alternatively possible to send back the correction coefficient $\delta$ instead of the answer reference time signal.

In a system construction where the correction coefficient $\delta$ is transmitted to the transmission-reception ECU 10, the transmission-reception ECU 10 performs the operation of decoding the content of the answer signal from the transmitter-receiver unit 2 while correcting the time information included in the time series pulse signal forming the answer signal, using the correction coefficient $\delta$.

It is also possible for the transmitter-receiver unit 2 to produce an answer signal formed of a time series pulse signal including the time information that has been corrected by the correction coefficient $\delta$, and then transmit the thus-corrected answer signal.

In this system construction, the transmission-reception ECU 10 simply decodes the content of the answer signal from the transmitter-receiver unit 2, on the basis of the time information included in the time series pulse signal forming the answer signal.

Although the embodiment employs the CR oscillating circuit 14 to generate the clock signal of the microcomputer 3, other types of oscillating circuits may be used. Likewise, the transmission-reception system of the invention is not limited to the immobilization function of motor vehicles, but may be applied to other types of transmission-reception systems.

While the present invention has been described with reference to what is presently considered to be a preferred embodiment thereof, it is to be understood that the invention is not limited to the disclosed embodiments. To the contrary, the invention is intended to cover various modifications and equivalent arrangements included within the spirit and scope of the appended claims.

What is claimed is:

1. A transmission-reception system comprising:
    a transmitter-receiver device transmitting an enquiry signal comprising a time signal including time information and a power signal, the transmitter-receiver device transmitting a reference time signal of a fixed time length together with the power signal prior to an operation of transmitting the enquiry signal; and
    a transponder that is switchable to an active state by the power signal from the transmitter-receiver device, for decoding content of the received enquiry signal on the basis of the time information, and sending back to the transmitter-receiver device an answer signal in accordance with the result of decoding, the transponder measuring the time length of the reference time signal, calculating a correction value based on a ratio between the measured time length and the reference time length, and, while decoding the enquiry signal, correcting the time information included in the time signal forming the received enquiry signal using the correction value.

2. A transmission-reception according to claim 1, wherein:
    the transponder comprises a microcomputer for decoding the content of the enquiry signal and controlling the transmission of the answer signal, and a storage portion storing a value of the reference time, the transponder measuring the time length of the time reference signal using a clock signal of the microcomputer, the time signal portion of the enquiry signal comprising a time series pulse signal, and the correction value comprising a correction coefficient.

3. A transmission-reception system according to claim 2, wherein:
    wherein the transponder sends back an answer signal formed of a time series pulse signal including time information, and transmits an answer reference time signal of a fixed time length using the clock signal of the microcomputer, prior to an operation of transmitting the answer signal, and
    wherein the transmitter-receiver device, upon receiving the answer reference time signal from the transponder, measures the time length of the answer reference time signal, calculates a second correction value based on a ratio between the measured time length and the time length of the reference time signal, and decodes the contents of the received answer signal while correcting the time information included in the time series pulse signal forming the answer signal, using the second correction value.

4. A transmission-reception system according to claim 1, wherein the transponder sends back an answer signal formed of a time series pulse signal including time information, and sends back the correction value prior to an operation of transmitting the answer signal, and
    wherein the transmitter-receiver device decodes the content of the answer signal from the transponder while correcting the time information included in the time signal forming the answer signal, using the correction value.

5. A transmission-reception system according to claim 1, wherein the transponder sends back an answer signal formed of a time series plus signal including time information that has been corrected by the correction value; and wherein the transmitter-receiver device decodes the content of the answer signal from the transponder on the basis of the time information included in the time series pulse signal forming the answer signal.

6. A method of performing between a transponder and a transmitter-receiver device, comprising the steps of:

a) transmitting a first signal to a transponder, the first signal comprising a reference time signal;

b) measuring in the transponder the time length of the reference time signal;

c) calculating a correction value based on the time length measured in step (b) and the reference time signal length;

d) receiving a second signal including time information as an enquiry signal from the transmitter-receiver device in the transponder;

e) correcting the time information received in step (d) based on the correction value caculated in step (c); and f) decoding the second signal based on the time information corrected in step (a).

7. The method according to claim 6, wherein the first signal further comprises a power signal.

8. The method according to claim 7, further comprising the steps of:

g) transmitting a third signal as an answer signal from the transponder, based on the decoding of the second signal in step (f).

9. The method according to claim 8, further comprising the step of:

h) transmitting the correction value calculated in step (c) to the transmitter-receiver device; and i) correcting the time information contained in the second signal based on the correction value transmitted in step (h).

* * * * *